Aug. 20, 1968 TAMEO TANAKA 3,398,293
GATING CONTROL SYSTEM UTILIZING ELECTROPARAMETRIC OSCILLATION
Filed Dec. 24, 1963 4 Sheets-Sheet 1
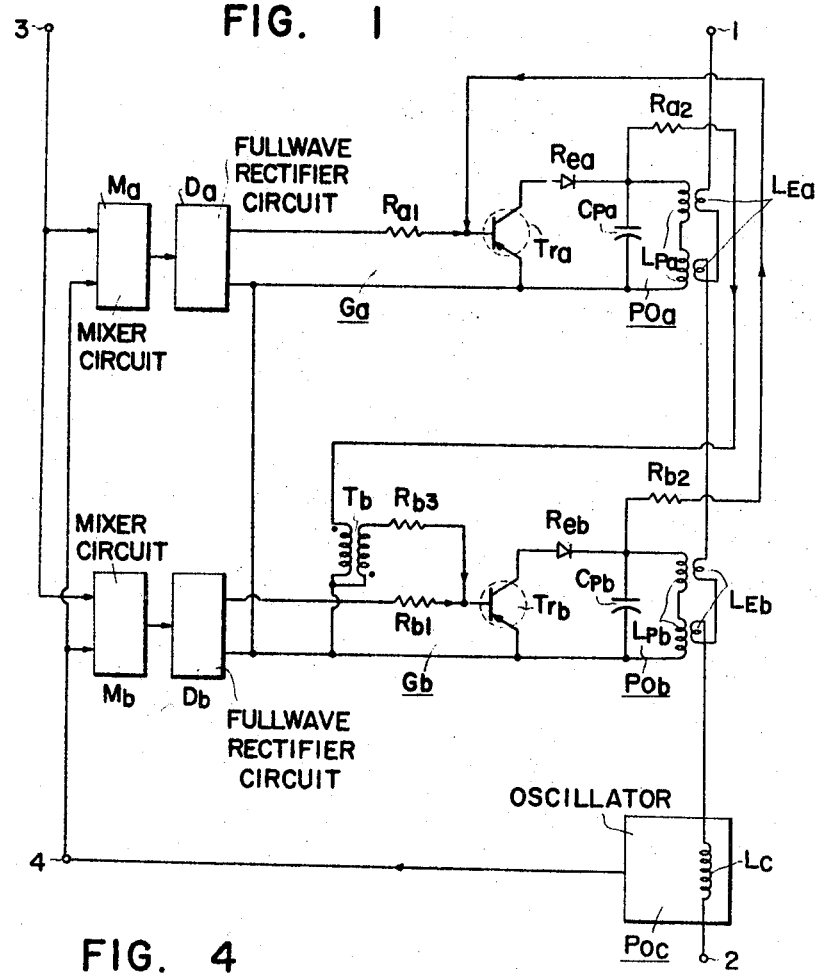
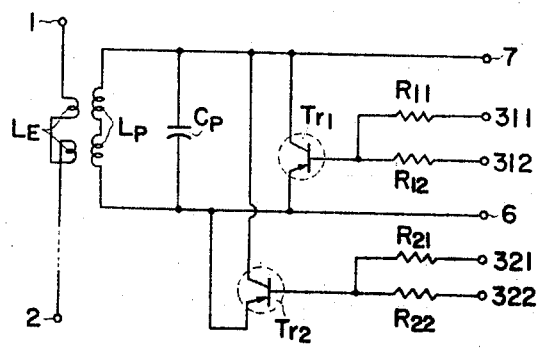
INVENTOR.
Tameo Tanaka
BY
Mestern & Mestern Aug. 20, 1968  TAMEO TANAKA  3,398,293
GATING CONTROL SYSTEM UTILIZING ELECTROPARAMETRIC OSCILLATION
Filed Dec. 24, 1963  4 Sheets-Sheet 2

INVENTOR.
Tameo Tanaka
BY
Western & Western

INVENTOR.
Tameo Tanaka
BY
Mestern & Mestern

Aug. 20, 1968 TAMEO TANAKA 3,398,293
GATING CONTROL SYSTEM UTILIZING ELECTROPARAMETRIC OSCILLATION
Filed Dec. 24, 1963 4 Sheets-Sheet 4

INVENTOR.
Tameo Tanaka
BY
Western & Western

United States Patent Office 3,398,293
Patented Aug. 20, 1968

3,398,293
GATING CONTROL SYSTEM UTILIZING
ELECTROPARAMETRIC OSCILLATION
Tameo Tanaka, Yahata-ku, Kitakyushu-shi, Japan, assignor to Kabushiki Kaisha Yaskawa Denki Seisakusho, Kitakyushu-shi, Japan, a joint-stock company of Japan
Filed Dec. 24, 1963, Ser. No. 333,029
Claims priority, application Japan, Dec. 29, 1962, 37/59,477; Feb. 9, 1963, 38/6,768; Mar. 1, 1963, 38/11,085; Mar. 2, 1963, 38/11,193; Mar. 6, 1963, 38/11,943; June 6, 1963, 38/29,672; Oct. 7, 1963, 38/52,448
11 Claims. (Cl. 307—88)

ABSTRACT OF THE DISCLOSURE

A gating control system utilizing a continuously exciting parametric oscillator as operational element. The phase state of the oscillation voltage is controlled at will to accomplish logical operations, due to the resonance of said element. The main circuit of, e.g., a transistor functions as an electronic valve. It is inserted in parallel with the oscillation circuit of the parametric oscillation and can so be controlled as to retain the phase of any oscillation voltage.

This invention relates to logical circuits, and more particularly it relates to a new gating control system in a logical circuit having a continuously excited parametric oscillator as an operational element.

Parametron operational systems of known type have heretofore had the disadvantage of slow operational speed. In an ordinary parametron circuit in which the so-called three-beat excitation is used, since logical operation is accomplished during the transition from a certain beat to the succeeding beat, the conditions for excitation buildup and the state of oscillation buildup impose a limit on the minimum time required for one beat. This limitation is the cause for the delay in speed of ordinary parametron operational systems.

It is an object of the invention to provide a gating control system capable of effecting opening and closing gating action with quick response through the use of the "0" phase (O radian) and "π" phase (π radians) of the oscillation voltage phase of a continuously excited parametric oscillator as a logical signal, and through the use of a control signal of the same frequency as the logical signal.

The system according to the present invention is highly suitable for use in circuits such as flip-flop circuits and shift register circuits and is capable of accomplishing gating control with an operational speed which is substantially higher than that of conventional parametrons of three-beat excitation type.

According to the present invention, a parametron element is continuously excited, and the phase state of the oscillation voltage due to the resonance of the said element is controlled at will to accomplish logical operation.

More specifically, by controlling the main circuit current of an element (for example, a transistor) which functions as an electronic valve and is inserted in paralled with the oscillation circuit of this parametric oscillation by means of an A.C. control signal, it is possible to retain the phase of any oscillation voltage. Since the electronic valve element in this case functions as a gate, a gate means in which the keying of a three-beat exciting circuit is not used is obtained. Therefore, this gate means compares favorably in speed with gate devices comprising principally semi-conductor operational elements. Moreover, since a parametric alternating current is used as the gating control signal, it is possible through the use of this gate means to arrange an operational circuit having a high signal-to-noise (S–N) ratio similarly as in the case of a parametron.

The nature, principles, and details, as well as specific objects, of the invention will be more clearly apparent by reference to the following detailed description of a few preferred embodiments of the invention, when read in conjunction with the accompanying drawings in which like or equivalent parts are designated by like reference characters, and in which:

FIG. 1 is an electrical connection diagram indicating the circuit of an embodiment illustrating the principle of the invention;

FIG. 4 is a circuit diagram indicating a circuit having a plurality of gates formed by the connection of a plurality of semiconductors in parallel to an oscillation circuit;

Figure 5:
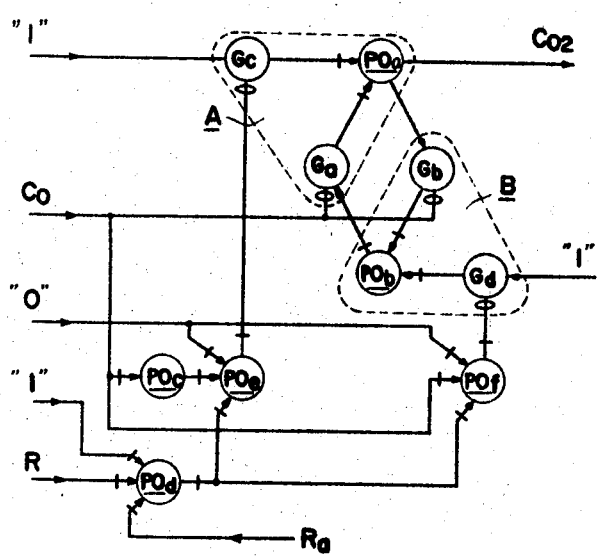
FIG. 5 is a schematic diagram indicating a shift register wherein the gates of the circuits shown in FIG. 1 or 3 and FIG. 4 are used.
Figure 10:
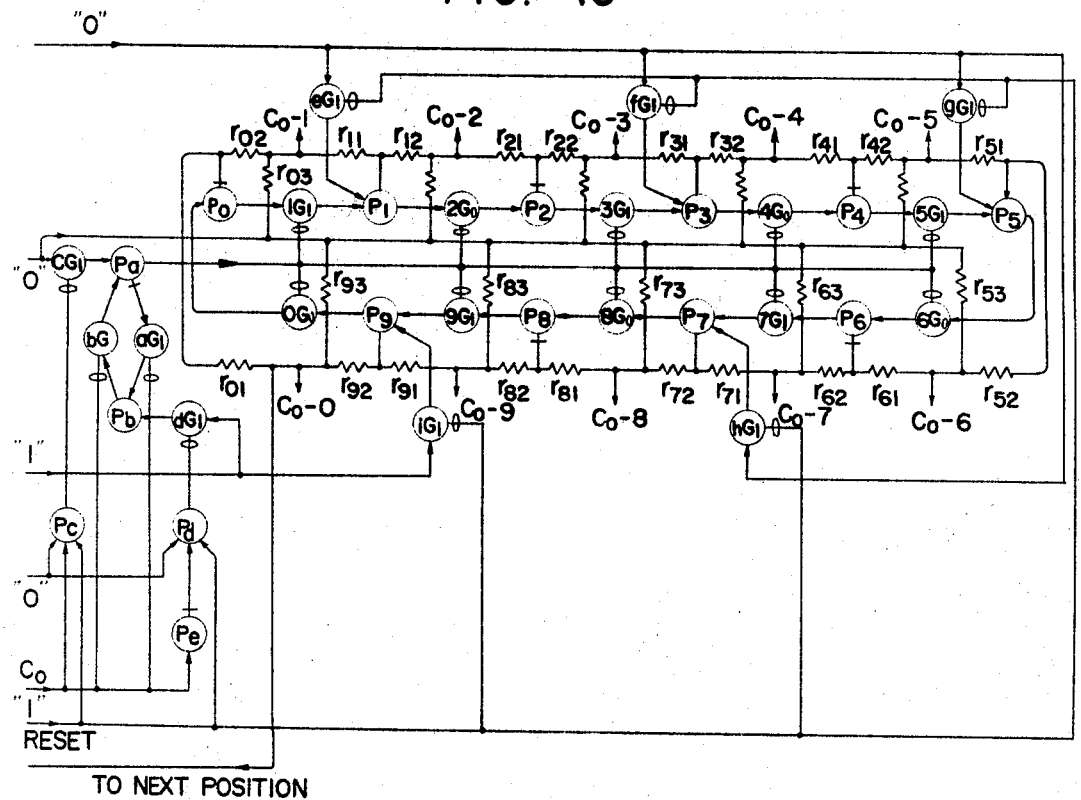

FIGS. 6 through 9, inclusive, are circuit diagrams showing gate circuits in each of which a D.C. control signal is applied to an electronic valve in addition to a parametric A.C. signal;

FIG. 10 is a circuit diagram showing the circuit for one digit of a shift register in which, through the use of the circuits shown in FIGS. 1, 4 and 5, binary codes are counted by means of decimal codes.

In a first embodiment of the invention, shown in FIG. 1 and illustrating the principle thereof, the circuit from the terminal 1 to the terminal 2 is an excitation circuit with exciting coils $L_{Ea}$ and $L_{Eb}$, which, together with resonance coils $L_{Pa}$ and $L_{Pb}$ and tuning capacitors $C_{Pa}$ and $C_{Pb}$, form parametric oscillators $PO_a$ and $PO_b$.

There are further provided: electronic valves $Tr_a$ and $Tr_b$ which are semiconductor elements (with control electrodes) such as, for example, pnp type transistors; unilateral rectifier elements $R_{ea}$ and $R_{eb}$ which are for the purpose of blocking reverse direction current and are, for example, silicon diodes; non-inductive resistances $R_{a1}$, $R_{a2}$, $R_{b1}$, $R_{b2}$, and $R_{b3}$; and a phase-inverting transformer $T_b$. A parametric A.C. voltage is introduced through an input terminal 3 into the instant circuit as a gating control signal applied from the outside, and a constant signal is introduced through an input terminal 4, the two said signals being additively combined as a sum by mixer circuits $M_a$ and $M_b$, the outputs of which are introduced into fullwave rectifier circuits $D_a$ and $D_b$. The above-mentioned components in two groups distinguished by the subscripts $a$ and $b$ respectively constitute gates $G_a$ and $G_b$.

In addition, there is provided a constant oscillator $PO_c$ for applying the aforementioned constant signal to the terminal 4, the said oscillator is parametrically excited by the oscillation coil $L_c$. In the circuit diagram shown in FIG. 1, the arrows indicate directions in which signals or oscillation voltages are applied.

For convenience in the following description, the logical signal representing a parametric oscillation voltage of zero radian phase is designated by the symbol "1," and that of opposite phase relationship of π radians is designated by the symbol "0."

Upon being continuously excited by the excitation circuit from the terminal 1 to terminal 2, the parametric oscillators $PO_a$ and $PO_b$ and the constant oscillator $PO_c$ generate parametric oscillation voltages. When considering the oscillation phase of the oscillators $PO_a$ and $PO_b$ by taking the parametric oscillation voltage of the constant oscillator $PO_c$ as a standard corresponding to a zero radian phase which is taken as the symbol "1," the following four phases can be assumed according to the characteristic of parametric oscillation:

OSCILLATION VOLTAGE PHASE

| Oscillator | Case 1 | Case 2 | Case 3 | Case 4 |
|---|---|---|---|---|
| $PO_a$ | "1" | "0" | "1" | "0" |
| $PO_b$ | "0" | "1" | "1" | "0" |

The operation of the instant apparatus when, under the above-described conditions, a parametric A.C. control signal is applied through the terminal 3, and the voltage phase of the said signal is in the state "1" will now be considered. However, the circuit according to this invention is the two value-logical operational circuit, so that the signal is always "0" or "1" and the control signal introduced from the terminal 3 does not become non-voltage state. The mixer circuits $M_a$ and $M_b$ are so adapted that their constant inputs are applied with mutually opposite polarity. That is, a logical signal "1" from the constant oscillator $PO_c$ is applied as "1" in the mixer circuit $M_a$, while the mixer circuit $M_b$, its voltage phase is inverted, and the signal is applied as "0." Accordingly, although the output of the mixer circuit $M_a$ under these assumed conditions exhibits a doubling of its voltage wave peak, the output as a phase signal remains unchanged as "1," and the output of the fullwave rectifier $D_a$ has a halfwave in the positive direction which is continuous. Then, even when an oscillation voltage "0" applied from the oscillator $PO_b$ by way of the resistance $R_{b2}$ is combined with the said output of the rectifier $D_a$, the base of the transistor $Tr_a$ functioning as an electronic valve does not become negative. Therefore, the transistor $Tr_a$ does not become active. This result indicates that the gate $G_a$ containing the transistor $Tr_a$ is closed, and that the oscillator $PO_a$ has memorized the signal "1."

On one hand, in the mixer circuit $M_b$, a control signal "1" introduced through the terminal 3 and a signal resulting from the phase inversion of the constant signal "1" applied through the terminal 4 are combined. As a result, nothing remains in the output of the mixer circuit $M_b$. Consequently, the fullwave rectifier $D_b$ also produces no output, with the result that the oscillation voltage "1" of the oscillator $PO_a$, after passing through the output resistance $R_{a2}$ and being phase inverted into a signal "0" in the inversion transformer $T_b$, is applied as a signal "0" to the base of the transistor $Tr_b$. Then, since the oscillation voltage of the oscillator $PO_b$ is "0," from a consideration of the potentials of the collector and base of the transistor $Tr_b$, it is observed that these potentials become negative at the same time with respect to the emitter. Therefore, during this negative half cycle, the transistor $Tr_b$ becomes active. Expressed in other terms, in the negative half-wave, the oscillation voltage "0" of the oscillator $PO_b$ is subjected to shorting and attenuation by the transistor $Tr_b$ and the silicon diode $Re_b$, and its oscillation voltage changes into "1" of opposite phase.

Then, when the control signal changes to "0," the fullwave rectifier $D_a$ produces no output, similarly as described above, and, since the gate $G_a$ is in its open state, the oscillation voltage "1" of the oscillator $PO_b$ is applied through the output resistance $R_{b2}$ to the base of the transistor $Tr_a$. Consequently, the oscillation voltage "1" of the oscillator $PO_a$ is subjected to shorting and attenuation during each half cycle when the transistor collector is negative, and its oscillation voltage gives rise to one of "0" of reverse phase thereto. The continuous half wave in the positive direction which is produced at this time by way of the mixer circuit $M_b$ from the fullwave rectifier $D_b$ prevents the gate $G_b$ from opening.

When the control signal applied through the terminal 3 changes from "1" to "0" in this manner, the oscillation signal of the oscillator $PO_a$ is caused by the oscillation $PO_b$ to change from "1" to "0." Then, when the control signal undergoes transition from "0" to "1," the oscillation voltage of the oscillator $PO_b$ is caused by the oscillation voltage "0" of the oscillator $PO_a$ to change from "1" to "0."

That is, a change in the control signal causes the gate $G_b$ or $G_a$ to open, and a logical signal "1" or "0" is caused to shift to the oscillator $PO_a$ or $PO_b$. Consequently, the continuously excited parametric oscillators $PO_a$ and $PO_b$ are rendered capable by the gates $G_a$ and $G_b$ of discriminating the logical phase of "1" or "0" of the control signal.

The above explanation has been made regarding said case 1, and the operation of gates $G_a$ and $G_b$ regarding said cases 2 to 4 can be shown in the following table.

| Case | Oscillator or Rectifier | Assumed initial Oscillation Phase | $e_3$ being added as "1" | $e_3$ being changed into "1" | $e_3$ being changed into "1" | $e_3$ being changed into "0" |
|---|---|---|---|---|---|---|
| 2 | $PO_a$ | "0" | "0" | "1" | "1" | "0" |
|   | $PO_b$ | "1" | "0" | "0" | "1" | "1" |
|   | $D_a$ output | | $e_D$ | None | $e_D$ | None |
|   | $D_b$ output | | None | $e_D$ | None | $e_D$ |
| 3 | $PO_a$ | "1" | "1" | "0" | "0" | "1" |
|   | $PO_b$ | "1" | "1" | "1" | "0" | "0" |
|   | $D_a$ output | | $e_D$ | None | $e_D$ | None |
|   | $D_b$ output | | None | $e_D$ | None | $e_D$ |
| 4 | $PO_a$ | "0" | "0" | "1" | "1" | "0" |
|   | $PO_b$ | "0" | "0" | "0" | "1" | "1" |
|   | $D_a$ output | | $e_D$ | None | $e_D$ | None |
|   | $D_b$ output | | None | $e_D$ | None | $e_D$ |

As will be understood from the above table, in all of the cases also, the oscillators $PO_a$ and $PO_b$ are changed according to the change of the control signal.

Figure 2:
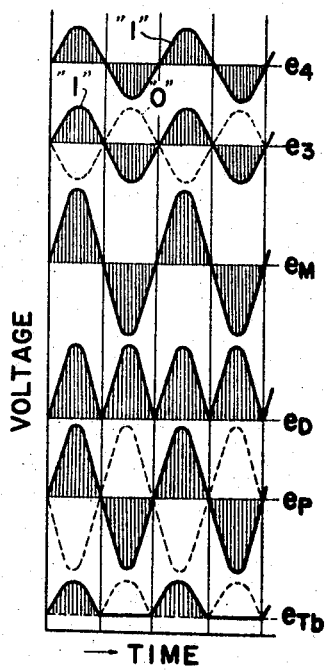
FIG. 2 is a graphical representation indicating voltage waveforms with respect to time.

The waveforms of the signal voltages in the circuits at various parts of the apparatus shown in FIG. 1 are indicated in FIG. 2. The operation and resulting voltage waveforms will now be considered relative to the gate $G_a$ and the oscillator $PO_a$. If, when the signal $e_4$ applied through the terminal 4 is "1," the control signal $e_3$ applied through the terminal 3 is "1," the output voltage $e_M$ of the mixer circuit $M_a$ will assume a waveform of $e_4+e_3$, which will be fullwave rectified by the rectifier circuit $D_a$ to produce an output voltage $e_D$. Regardless of whether the oscillation voltage $e_P$ from the other oscillator $PO_b$ is "1" (full-line curve) or is "0" (dotted-line curve) for this voltage $e_D$, the potential of the base voltage $e_{Tb}$ of the transistor $Tr_a$ does not become negative. Even if the transistor $Tr_a$ is in non-conductive state, the fullwave rectifying voltage $e_D$ of the fullwave rectifier $D_a$ is led out as an output. Accordingly, in a half cycle in which the oscillating voltage $e_P$ of the oscillator $PO_b$ becomes negative, the current flows via a common return line connecting the fullwave rectifier $D_a$—the resistor $R_{a1}$—the base of the transistor $Tr_a$—the resistor $R_{b2}$—the oscillator $PO_b$—the emitters of both transistors. In this case, the circuit is designed so that peak value of the voltage $e_D$ decreases to ¼ due to passing of said current through the resistor $R_{a1}$ and also peak value of the voltage $e_P$ decreases to ¼ due to passing of said current through the resistor $R_{b2}$. Consequently, if considering the base voltage $e_{Tb}$ of the transistor $Tr_a$ at that time, it becomes ($e_{Tb} \times 4 = e_D + e_P$), and the relationship of two kinds of voltages is shown correspondingly in such a manner that when the oscillating voltage $e_P$ is shown by the full line, the base voltage $e_{Tb}$ is also shown by the full line or when the former voltage $e_P$ is shown by the dotted line, the latter voltage $e_{Tb}$ is also shown by the dotted line. Accordingly, when the oscillation voltage $e_P$ is representable by the full-line curve, the base voltage $e_{Tb}$ is also representable by its full-line curve, and when the voltage $e_P$ is according to the dotted-line curve, the voltage $e_{Tb}$ is also according to its dotted-line curve, that is, the two voltages are caused to be in corresponding relationship.

When the control signal $e_3$ becomes "0," it is canceled by the constant signal "1" in the mixer circuit $M_a$, and the mixer output voltage $e_M$ and the fullwave rectified voltage $e_D$ become zero. Therefore, only the oscillation voltage $e_P$ of the other oscillator $PO_b$ is caused by the resistance $R_{b2}$ to drop to ¼, and the resulting base voltage having a negative half cycle is applied to the transistor $Tr_a$ constituting an electronic valve. Consequently, the transistor $Tr_a$ opens its valve as shown.

Figure 3:
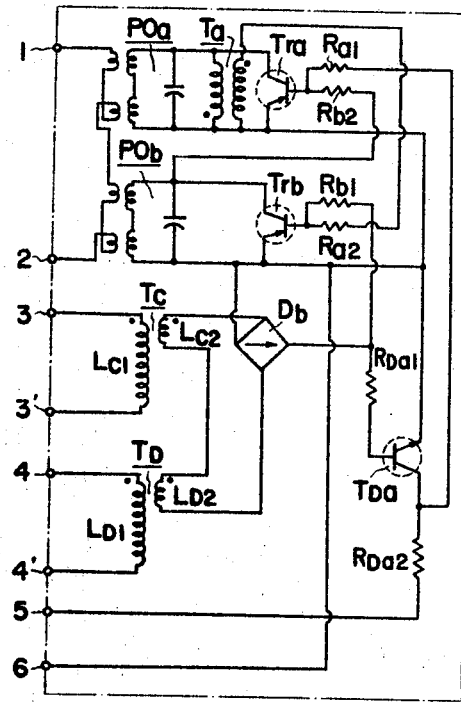
FIG. 3 is a circuit diagram indicating a second embodiment of the invention based on the principle illustrated in FIG. 1.

A second embodiment of the invention, which is an improved form of the circuit shown in FIG. 1, is indicated in FIG. 3. In this circuit arrangement, a transistor $T_{Da}$ is provided in place of one mixer circuit $M_a$ and its corresponding fullwave rectifier circuit $D_a$, and there are further provided resistances $R_{Da1}$ and $R_{Da2}$, a phase-inverting transformer $T_a$, and transformers $T_C$ and $T_D$ respectively having primary windings $L_{C1}$ and $L_{D1}$ and secondary windings $L_{C2}$ and $L_{D2}$, the coils $L_{C2}$ and $L_{D2}$ being so connected that their induced voltages will be mutually additive. A control signal $e_3$ enters through a terminal 3 and returns through a terminal 3'; a constant signal $e_4$ enters through a terminal 4 and returns through a terminal 4'; and a fullwave rectified voltage signal $e_D$ enters through a terminal 5 and, passing through a common line, returns through a terminal 6.

When a control signal "1" enters through the terminal 3, and a constant signal "1" enters through the terminal 4, the fullwave rectified voltage $e_D$ indicated in FIG. 2 is produced as an output from the rectifier $D_b$ and closes the transistor $Tr_b$, and the transistor $T_{Da}$ opens. At this time, since the fullwave rectified voltage $e_D$ applied through the terminal 5 passes through the resistance $R_{Da2}$ and returns by way of the transistor $T_{Da}$ to the terminal 6, the base of the transistor $Tr_a$ is not affected by the voltage $e_D$ because the transistor $T_{Da}$ is open, the collector voltage is nearly to zero. Consequently, the transistor $Tr_b$ closes, and the oscillator $Po_b$ is not controlled by the oscillator $Po_a$, but the valve of the transistor $Tr_a$, on the contrary, will open if the oscillation voltages of the oscillators $PO_a$ and $PO_b$ are of the same phase. For example, if these oscillation voltages are both "1," the oscillator $PO_a$ will be caused by the oscillation voltage "1" from the oscillator $PO_b$ to generate an oscillation voltage "0" of the phase opposite thereto.

If, subsequent to the above-described state, a control signal "0" enters through the terminal 3, the voltage induced in the secondary windings $L_{C2}$ and $L_{D2}$ of the transformers $T_C$ and $T_D$ will be cancelled, and no output will be produced from the rectifier $D_b$. Consequently, the transistor $T_{Da}$ will be closed, and the transistor $Tr_b$ will be in an opened state. Accordingly, the fullwave rectified voltage $e_D$ from the terminal 5, without passing through the transistor $T_{Da}$, will be applied by way of the resistance $R_{a1}$ to the base of the transistor $Tr_a$, wherefore the transistor $Tr_a$ will assume its closed state. Furthermore, since the oscillation voltage "0" of the oscillator $PO_a$ will be subjected to voltage phase inversion in the transformer $T_a$ to become "1" and will be applied by way of resistance $R_{a2}$ to the base of the transistor $Tr_b$, the oscillator $PO_b$ will generate an oscillation voltage "0." The collector voltage of the transistor $T_{Da}$ is higher by the amount of voltage drop in the regular direction of said transistor than the emitter voltage (zero voltage at a common return line) at the time when said transistor turns on, and when the transistor $T_{Da}$ turns off, the positive voltage to be imparted to the terminal 5 is $e_D$, and also the emitter voltage of the transistor $Tr_a$ is the zero voltage of the common return line. Accordingly, transistor $Tr_a$ does not turn on only by the operation of the collector voltage of the transistor $T_{Da}$.

Thus, the above-described embodiment of the invention shown in FIG. 3 has an operation which is equivalent to that of the first embodiment shown in FIG. 1, and it is possible to omit two coils for inducing voltages to the transformers $T_C$ and $T_D$ and to the fullwave rectifier $D_A$ and to omit the rectifier $D_A$. The output terminal of the logical operation is constituted by connecting a coupling resistor with both terminals of the tuning condensers of the oscillators $PO_a$ and $PO_b$ directly or via the transformer.

An example of a parametric oscillation circuit wherein a plurality of transistors (two, $Tr_1$ and $Tr_2$, are shown) are provided in parallel arrangement is shown in FIG. 4. The bases of the transistors $Tr_1$ and $Tr_2$ are respectively connected by way of base resistances $R_{11}$, $R_{12}$ and $R_{21}$, $R_{22}$ to control signal input terminals 311, 312 and 321, 322. The transistors $Tr_1$ and $Tr_2$ are connected in parallel to a parametric oscillator comprising a tuning capacitor $C_P$ and a resonance coil $L_P$ which is continuously excited by an exciting coil $L_E$ of an excitation circuit shown between terminals 1 and 2. The parametric oscillator and the parallelly connected transistors are provided with a common line terminal 6 and an oscillation voltage output terminal 7, the said oscillator being appropriately controlled by the transistors functioning as electronic valves.

For example, if a positive D.C. voltage is being impressed on the terminal 311, the base potential of the transistor $Tr_1$ will be prevented from becoming negative, irrespective of the nature of the parametric A.C. control voltage applied to the terminal 312. Accordingly, as long as the said positive D.C. voltage does not eliminate the control input, the electronic valve transistor $Tr_1$ will remain closed. If, in such a case, a positive D.C. voltage as mentioned above is not being applied to the base of another transistor, i.e., transistor $Tr_2$, it will be possible to control at will, by means of the parametric A.C. control voltage, the voltage phase of the oscillation voltage as a logical signal. In this case, the impedance setting should be high so as to prevent the oscillation condition of the oscillator from being affected. Furthermore, regarding also the resistances $R_{11}$, $R_{12}$, etc., these should be suitably selected so that majority decision operation will be accomplished when the voltage for gate closing is not applied, and the number thereof is unlimited.

A schematic diagram indicating the compositional arrangement of a shift register in which the circuits of FIG. 1 or 3 and FIG. 4 are utilized is shown in FIG. 5. The circuit shown comprises, essentially, parametric oscillators $PO_a$, $PO_b$, $PO_c$, $PO_d$, $PO_e$, and $PO_f$ and gates $G_a$, $G_b$, $G_c$, $G_d$, $G_e$, and $G_g$, which depend on electronic valve transistors. Reference character $C_0$ designates a logical signal as information to be counted, "1" and "0" states thereof arriving alternately. The signals Const. "1" and Const. "0" are respectively constant signal "1" and constant signal "0." The symbols used in the various signal paths are as follows:

Symbol → indicates input or output of a logical signal;

Symbol —|→ indicates the inversion of a logical signal into a logical signal of opposite phase; and Symbol -⊖→ indicates a control input for gate opening and closing.

Further, reference character R designates a signal for resetting, and $C_{O2}$ designates a logical signal which has been binary coded. The gates $G_a$, $G_c$ and $G_d$ are adapted to be opened by a signal "1," and the gate $G_b$ is adapted to be opened by a signal "0." The oscillators $PO_a$ and $PO_b$ have conjugate functions (that is, they memorize signals of mutually opposite phase, so that when $PO_a$ is "1," $PO_b$ is "0") and, together with gates $G_a$ and $G_b$, constitute elements of a binary counter forming a flip-flop circuit. Accordingly, each of the groups A and B of the elements corresponds to the circuit shown in FIG. 4.

In the operation of the circuit as described above and shown in FIG. 5, the count signal $C_O$ is sent in the form one set per count of a continuously excited logical signal "1" or "0." First, the case when this count signal $C_O$ is "0" will be considered. When, as a resetting signal R or an automatic resetting signal $R_a$, "1" is sent to the oscillator $PO_d$, since a constant signal "1" is being separately applied, the oscillator $PO_d$ is caused by a majority-decision logical operation of opposite sign of the input to produce an oscillation of "0," and its output is inverted, whereby a signal "1" is sent to the oscillator $PO_e$ and $PO_f$. At this time, the oscillator $PO_c$ is caused by the count signal $C_O$ to be in the oscillation state of "1," and the oscillator $PO_e$ is caused by the constant "0" and the input from the oscillators $PO_c$ and $PO_d$ to be in the oscillation state of "0." Consequently, the gate $G_c$ opens. Similarly, the oscillator $PO_f$ is in the oscillation state "1," and the gate $G_d$ is open. Accordingly, the oscillator $PO_a$ is caused by the input signal from constant "1" through the gate $G_c$ to assume the oscillation state of "0," and its output acting through the open gate $G_b$ causes the oscillator $PO_b$ to assume the oscillation state "1." Thus, when the count signal $C_O$ is "0," the oscillator $PO_a$ is reset by the signal "1" of the automatic resetting signal $R_a$ to the oscillation state of "0."

Then, when the count signal becomes "1," the gates $G_d$ and $G_a$ open, and since the gates $G_c$ and $G_b$ are open, the oscillator $PO_b$ is caused by the input signal passing through the gate $G_d$ from the constant "1" to assume the oscillation state of "0," and, furthermore, the oscillator $PO_a$ is caused by the input signal entering through the gate $G_a$ from the oscillator $PO_b$ to assume the oscillation state of "0."

In view of the foregoing consideration, it can be readily observed that by connecting any desired number of logical elements alternately to obtain the arrangement of the oscillators $PO_a$ and $PO_b$ and the gates $G_b$ and $G_a$ of $PO_a \rightarrow G_b \rightarrow PO_b \rightarrow G_a \rightarrow$ . . . and sending the states of "1"$\rightarrow$"0"$\rightarrow$"1"$\rightarrow$"0"$\rightarrow$ . . . of the common shift signal, that is, the count signal $C_O$, a shift register is obtained. It will also be apparent that the resetting of the content of this shift register to the state of "0" and also the setting to a certain particular content can be accomplished through the use of this circuit.

In further embodiments of the invention as shown in FIGS. 6 through 9, inclusive, a means to apply a D.C. signal, in each case, to the base of the electronic valve transistor $Tr$ is added.

Figure 6:
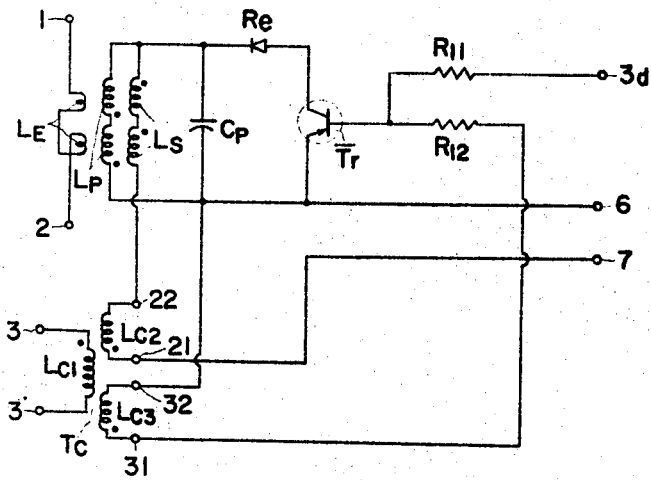

In the circuit shown in FIG. 6, a third coil $L_s$ on the secondary side wound about the core for parametric oscillation and the resonance coil are adapted to have opposite phases. Furthermore, the transformer $T_c$ is also so adapted that the coils $L_{c2}$ and $L_{c3}$ of its secondary side have their phases inverted with respect to the phase of the primary coil $L_{c1}$. The circuit is further provided with a unilateral rectifier element $R_e$ inserted in the direction of the main circuit current of the transistor $Tr$, resistors $R_{11}$ and $R_{12}$ connected in mutually parallel arrangement to the base of the transistor $Tr$, and a terminal $3d$ through which the D.C. signal is applied.

The operation of this circuit will now be described with respect to the polarity of the voltage induced in the coil $L_{C3}$ by the coil $L_{C1}$ at the time when a constant signal "1" is introduced through the input terminals 3 and 3′ of the transformer $T_c$. When the side of the terminal 3 of the coil $L_{C1}$ is positive, and the side of the terminal 3′ is negative, phase inversion takes place in the secondary coil $L_{C3}$, and the side of the terminal 32 becomes negative, and the side of the terminal 31 becomes positive. When this state is considered with respect to the common terminal 6, it will be observed that the signal applied from the terminal 31 to the resistance $R_{12}$ is a signal corresponding to a logical signal "1". Then, if the oscillation voltage of the continuously excited parametric oscillation circuit is in the state of "1" when a D.C. voltage is not applied to the terminal $3d$, the transistor $Tr$ will be so controlled by the input of the logical signal "1" applied by way of the resistance $R_{12}$ that an oscillation voltage "0" will be generated. In such a case, this oscillation "0" is inverted in the coil $L_s$ to become an oscillation of the terminal 22 then is of negative polarity relative to the common terminal 6, and the polarity of the voltage induced in the coil $L_{c2}$ by the coil $L_{c1}$ upon application of the constant input "1" is such that, similarly as in the case of the coil $L_{c3}$, the side of the terminal 21 is positive, and the side of the terminal 22 is positive, and the side of the terminal 22 is negative. Therefore, the circuit is so connected that the induced voltages of the coil $L_s$ and the coil $L_{c2}$ will cancel each other. However, the voltages of the coil $L_p$ and the coil $L_s$ are cascade connected and the terminal 22 side becomes a path transmitting an oscillation of "0" state with respect to the common terminal 6, the peak value of this oscillation being the sum of the two voltages. Consequently, at the terminal 7 there is produce an "0" output whose peak value is the differential voltage resulting from the constant signal induced in the coil $L_{c2}$. In the above consideration the terminal voltages of the coils $L_{c1}$, $L_{c2}$, $L_{c3}$ and $L_p$, $L_s$ are respectively taken to be equal for the sake of convenience in description. In general, the sum of the terminal voltages of the coils $L_p$ and $L_s$ should be greater than the terminal voltage of the coil $L_{c2}$.

If, with the circuit in the above-described state, a negative D.C. voltage is impressed on the terminal $3d$, the oscillation of the oscillator will stop completely, and from the terminal 7, the same signal voltage of the state "1" as the constant input induced in the coil $L_{c2}$ will be produced as the output. It will be apparent that, in the case when the constant signal entering the terminals 3 and 3′ is in the state "0", the output from the terminal 7 will be in the state "0" if the negative D.C. voltage is being applied to the terminal $3d$ and will be in the state "1" if the said D.C. voltage is not being applied.

Figure 7:
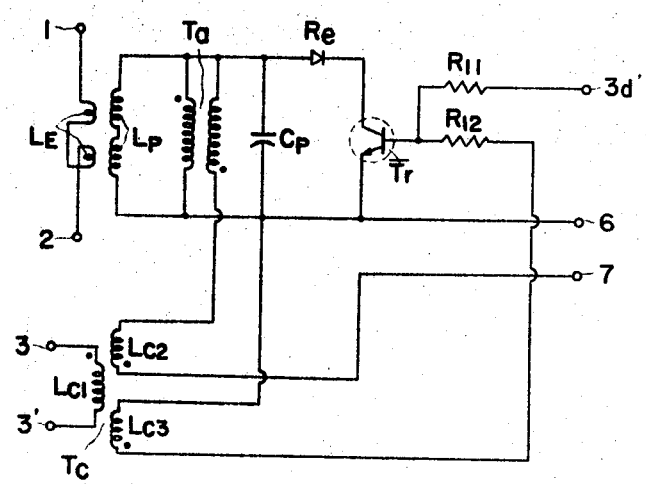

In the circuit shown in FIG. 7, the coil $L_p$ and the coil $L_s$ in the circuit shown in FIG. 6 are wound about two separate cores, and a phase-inversion transformer $T_a$ is provided. The terminal voltages on the primary and secondary sides of this transformer $T_a$ are caused to be equal, and the transistor $Tr$ is of npn type. Accordingly, a positive D.C. voltage for application to the terminal $3d'$ is used, and the operational effect obtained is the same as that in the case of the apparatus indicated in FIG. 6.

Figure 8:
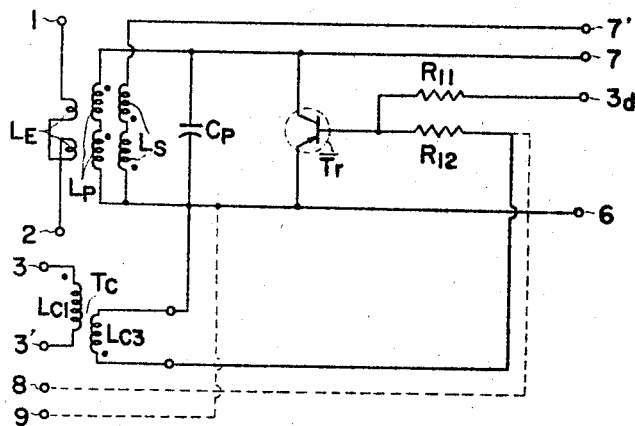

In the circuit shown in FIG. 8, the coil $L_{c2}$ of the secondary side of the transformer $T_c$ in the circuit shown in FIG. 6 is omitted, and an inverse phase output terminal 7′ is connected to one end of the coil $L_s$. By this arrangement, if a negative D.C. voltage is being applied to the terminal $3d$, the valve of the electronic valve transistor $Tr$ will be always open, irrespective of the phase of the oscillation voltage of the oscillator. Consequently, the state "1" or "0" is not produced as the output signal from the terminals 7 and 7′, that is, a parametric oscillation will cease.

If, on the other hand, a D.C. voltage is not being impressed on the terminal $3d$, and if the control signal entering the terminal 3 of the transformer $T_c$ is in the state "1", output signals of "0" and "1" states will be produced respectively at the terminals 7 and 7′. If the said control signal becomes "0", the said outputs also will be respectively inverted. An alternative arrangement which is equally effective is to apply the control signal through the use of a circuit as shown by dotted lines in FIG. 8 entering through a terminal 8 and returning through a terminal 6.

Figure 9:
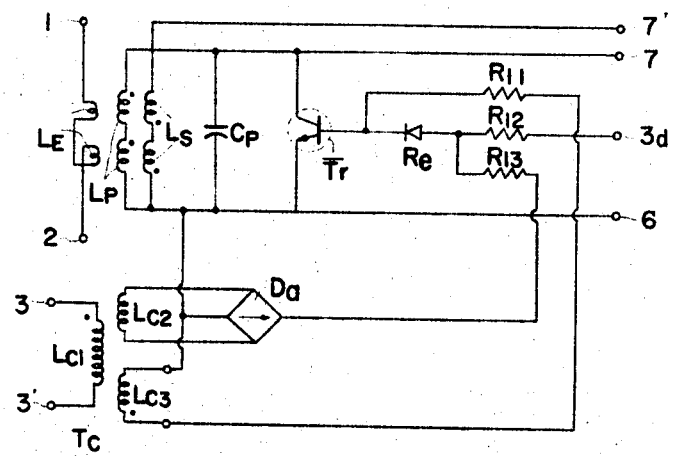

In the circuit shown in FIG. 9, three resistances $R_{11}$, $R_{12}$, and $R_{13}$ are connected in mutually parallel arrangement to the base of an npn type transistor Tr to accomplish logical operation of the control signal. In this circuit an output of positive potential from the fullwave rectifier $D_a$ is continuously being applied to the resistance $R_{13}$, and the circuit is so adapted that, as long as a negative D.C. voltage applied through the terminal $3d$ does not cancel the aforesaid positive voltage, the oscillation phase of the oscillator cannot be controlled by the parametric A.C. constant signal which is applied to the resistance $R_{11}$. Since the transistor Tr is of npn type, it is opened by the positive potential normally imparted to its base when a negative D.C. voltage is not applied to the terminal $3d$, and the parametric oscillation stops with respect to either of the states "1" and "0" of the constant signal, whereby no output is produced.

The circuit arrangement for one digit of a binary-coded decimal counter in which the circuits of FIGS. 1, 4, and 5 are incorporated is shown in FIG. 10. This circuit comprises, essentially, resistances $r_{01}$ through $r_{93}$, parametric oscillators $P_a$ through $P_e$ and $P_0$ through $P_9$, gates $1G_1$, $3G_1$, $5G_1$ . . . $9G_1$, $aG$, and $cG_1$ through $iG_1$, which are opened by the afore-described logical signal "1," and gates $OG_0$, $2G_0$ . . . $8G_0$, and $bG_0$, which are opened by the logical signal "0." Counted outputs are respectively designated by $C_0$–1 through $C_0$–9 and $C_0$–0.

As is indicated in FIG. 10, this circuit is a decimal ring counter wherein, between parametric oscillators comprising logical elements connected sequentially, there are alternately inserted gates which are opened by one kind of logical signal and closed by the other kind, the output of one flip-flop circuit driven by an input shift signal is used as a gate control signal, and for each cycle of the input shift signal, the logical signals memorized in the said logical elements are shifted one at a time.

As described above, the present invention provides a gating system by which the oscillation phase of a continuously excited parametric oscillator can be varied at will, and by suitably combining a number of such systems, an electronic computer or an electronic, numerical value control system possessing both the accuracy of operation of the so-called parametron element and the quick response of an electronic valve can be obtained.

It should be understood, of course that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A gating control system utilizing parametric oscillation, comprising, in combination, a parametric excitation circuit (T–2) provided with two exciting coils ($L_{Ea}$, $L_{Eb}$); resonance coils ($L_{Pa}$, $L_{Pb}$) coupled respectively with said exciting coils so as to be tuned with the parametric oscillation induced by said exciting coils; two parametric oscillators each of which comprises a tuning capacitor and collector and emitter of a transistor which are connected in parallel to one of said resonance coils; a constant oscillator ($PO_c$) including a constant oscillation coil ($L_c$) connected to said excitation circuit and always producing a parametric oscillation having a constant oscillation phase thereby to generate a constant signal at its output side control terminal for introducing an A.C. control signal; and two mixer circuits one of which is connected at its input side to said control terminal to receive said control signal and to the output side of said constant oscillator to receive said constant signal; the other of said mixer circuits connected at its input side to said control terminal to receive said control signal and to the output side of said constant oscillator to receive said constant signal in reverse phase; constant signal and control signal introduced into each of said mixer circuits being mixed as an algebraic sum; and characterized by that the output side of each of said mixer circuits is connected to the base of said transistor of the respective parametric oscillator through a respective fullwave rectifier and resistor to impart the output of said mixer circuit to said base; the output terminal of one parametric oscillator being connected through a resistor to the base of the transistor of the other parametric oscillator, the output terminal of said other parametric oscillator being connected through a resistor and a phase reversing transformer to the base of the transistor of said one parametric oscillator, whereby two transistors of the parametric oscillators are made to attain alternately conductive and non-conductive states in response to change of the phase of the control signal without relation to the oscillation phases of the parametric oscillators.

2. The gating control system according to claim 1, wherein at least one transistor having a grounded emitter is connected in parallel at its emitter and the collector in parallel to the tuning capacitor of each of the parametric oscillators; and in each of said oscillators two resistors are connected to each of the transistors, thereby to form a logical circuit at each transistor, said transistors being arranged so that when all the transistors except one are turned off and said one transistor is turned on, the phase of the oscillation voltage of the oscillator is controlled by the control voltage imparted to the base of said turned-on transistor.

3. A shift register which comprises a flip-flop circuit based on the gating control system according to claim 1, two gates of mutually opposite phases, and four logical operation elements, in which constant signals of both phase states "1" and "0" and a reset signal "1" of one phase state are used.

4. A gating control system utilizing parametric oscillation, comprising, in combination, a parametric excitation circuit provided with two exciting coils, resonance coils coupled respectively with said exciting coils so as to be tuned with the parametric oscillators each of which comprises a tuning capacitor and collector and emitter of a transistor which are connected in parallel to one of said resonance coils; a constant oscillator including a constant oscillation coil connected to said excitation circuit and always attaining parametric oscillation having a constant oscillation phase thereby to generate a constant signal at its output side; an input control terminal for introducing a control signal; a mixer circuit comprising two input transformers, the input sides of which are respectively connected to said input control terminal and the output side of said constant oscillator and the output side of said input transformers are connected in cascade; a fullwave rectifier, the input side and output side of which are respectively connected to the output side of said mixer circuit and to the base of the transistor of one of said parametric oscillators through a resistor; an NPN type transistor whose emitter is grounded; and a terminal circuit (5, 6) for supplying a voltage corresponding to the output voltage of said fullwave rectifier; and characterized by that the output terminal of said one parametric oscillator is connected to the base of the transistor of the other parametric oscillator through a resistor and the output side of said other parametric oscillator is connected to the base of the transistor of said one parametric oscillator through a phase reversing transformer and a resistor; said terminal circuit being connected to the collector circuit of said NPN type transistor through a resistor; the base and collector of said NPN type transistor respectively being connected to the output side of said fullwave rectifier through a resistor and to the base of the transistor of said other parametric oscillator, whereby two transistors of the parametric oscillators are made to become alternately conductive and non-conductive in response to change of the phase of the control signal without relation to the oscillation phases of the parametric oscillators.

5. The gating control system according to claim 4, wherein at least one transistor having a grounded emitter is connected in parallel at its emitter and the collector in parallel to the tuning capacitor of each of the parametric oscillators; and in each of said oscillators two resistors are connected to each of the transistors, thereby to form a logical circuit at each transistor, said transistors being arranged so that when all the transistors except one are turned off and said one transistor is turned on, the phase of the oscillation voltage of the oscillator is controlled by the control voltage imparted to the base of said turned-on transistor.

6. A shift register which comprises a flip-flop circuit based on the gating control system according to claim 4, two gates of mutually opposite phases, and four logical operation elements, in which constant signals of both phase states "1" and "0" and a reset signal "1" of one phase state are used.

7. In a logical circuit wherein oscillation of a given phase is continued by the electronic valve action of a transistor inserted in parallel in the oscillation circuit of a continuously-excited parametric oscillator, a gate device comprising means to apply a D.C. control voltage as one of the inputs of the said transistor, a coil wound about the same core as the said parametric oscillator and connected in cascade arrangement with a resonance coil to increase the oscillation voltage, and means to obtain the difference between the voltage so increased and a constant signal voltage, thereby to cause the logical signal output at the time when the said D.C. control voltage is applied to be opposite in phase to that at the time when the said D.C. control voltage is not applied.

8. A gate device according to claim 7 except that, for the coil for causing increase in the oscillation voltage, a separate transformer is used.

9. A gate device according to claim 7 wherein there is included a constant signal transformer having only one secondary coil, and the said coil cascade connected with the said resonance coil is adapted to produce simultaneously with the said resonance coil a logical signal output of the phase opposite that of the output of the said resonance coil.

10. A gate device according to claim 7 except that the said two coils are not cascade connected, and, through utilization of the algebraic sum of the fullwave rectified voltage of the said coil wound about the same core as the said parametric oscillator and the said D.C. control voltage, an oscillation signal voltage of the oscillator controlled to a constant signal from another coil wound about the same core as the abovesaid coil is obtained.

11. A ring counter comprising logical elements based on the system and devices according to claim 7 and successively connected, gate means which open with respect to logical signals of one phase and close with respect to those of the opposite phase, and which are inserted alternately between the said logical elements, and a flip-flop circuit driven by input shift signals, the output of the said flip-flop circuit being used as a gate control signal so as to cause logical signals memory stored in the said logical elements to shift one at a time for each cycle of transition from one phase to the opposite phase of the said input shift signal.

References Cited

UNITED STATES PATENTS

| 2,948,818 | 8/1960 | Goto | 307—88 |
| 2,957,087 | 10/1960 | Goto | 331—165 X |
| 3,109,935 | 11/1963 | Penoyer | 307—88 |
| 3,206,694 | 9/1965 | Bares | 331—165 X |
| 3,246,257 | 4/1966 | Evaids et al. | 331—165 X |
| 3,292,000 | 12/1966 | Chow | 307—88 |

BERNARD KONICK, *Primary Examiner.*

V. P. CANNEY, *Assistant Examiner.*